(12) United States Patent
Stoliar

(10) Patent No.: US 12,265,963 B1
(45) Date of Patent: Apr. 1, 2025

(54) SYSTEMS AND METHODS FOR IDENTIFYING BLOCKCHAIN ADDRESS OWNERS USING TEST FUNDS

(71) Applicant: JPMORGAN CHASE BANK, N.A., New York, NY (US)

(72) Inventor: Alex Stoliar, Giv'atayim (IL)

(73) Assignee: JPMORGAN CHASE BANK, N.A., New York, NY (US)

(*) Notice: Subject to any disclaimer, the term of this patent is extended or adjusted under 35 U.S.C. 154(b) by 170 days.

(21) Appl. No.: 18/063,012

(22) Filed: Dec. 7, 2022

Related U.S. Application Data

(60) Provisional application No. 63/265,127, filed on Dec. 8, 2021.

(51) Int. Cl.
*G06Q 20/40* (2012.01)
*G06Q 20/38* (2012.01)
*G06Q 50/00* (2012.01)

(52) U.S. Cl.
CPC ....... *G06Q 20/4014* (2013.01); *G06Q 20/389* (2013.01); *G06Q 50/01* (2013.01)

(58) Field of Classification Search
CPC .................................................. G06Q 20/4014
See application file for complete search history.

(56) References Cited

U.S. PATENT DOCUMENTS

| | | | |
|---|---|---|---|
| 2018/0247191 A1* | 8/2018 | Katz | G06Q 20/12 |
| 2020/0111080 A1* | 4/2020 | Metcalfe | H04L 9/3255 |
| 2022/0012367 A1* | 1/2022 | Ramanan | G06N 3/08 |
| 2023/0230052 A1* | 7/2023 | Davies | G06Q 20/3829 |

FOREIGN PATENT DOCUMENTS

| | | | | |
|---|---|---|---|---|
| CA | 3051393 | * | 1/2018 | H04L 51/04 |
| CN | 110413316 | * | 12/2023 | G06F 8/71 |

OTHER PUBLICATIONS

Franzoni, in "Leveraging Bitcoin Testnet for Bidirectional Botnet Command and Control Systems," from Financial Cryptography and Data Security, 2020 (Year: 2020).*

* cited by examiner

*Primary Examiner* — Olabode Akintola
*Assistant Examiner* — Brandon M Duck
(74) *Attorney, Agent, or Firm* — GREENBERG TRAURIG LLP

(57) ABSTRACT

Systems and methods for identifying blockchain address owners using test funds are disclosed. According to one embodiment, a method for identifying blockchain address owners using test funds may include: identifying, by an identity identification computer program executed by an electronic device, a room identifier for an application deployed to a test blockchain network for a main blockchain network; fetching, by the identity identification computer program, chat messages for the room identifier; extracting, by the identity identification computer program, identifying information from the chat messages; and outputting, by the identity identification computer program, the identifying information.

12 Claims, 3 Drawing Sheets

SYSTEMS AND METHODS FOR IDENTIFYING BLOCKCHAIN ADDRESS OWNERS USING TEST FUNDS

RELATED APPLICATIONS

This application claims priority to, and the benefit of, U.S. Provisional Patent Application Ser. No. 63/265,127, filed Dec. 8, 2021, the disclosure of which is hereby incorporated, by reference, in its entirety.

BACKGROUND OF THE INVENTION

1. Field of the Invention

Embodiments generally relate to systems and methods for identifying blockchain address owners using test funds.

2. Description of the Related Art

One notable feature of blockchain networks, such as Ethereum, okexchain, and evannetwork, is anonymity. Participants in such blockchain networks are able to keep their identity secret from others, revealing only their blockchain network addresses.

SUMMARY OF THE INVENTION

Systems and methods for identifying blockchain address owners using test funds are disclosed. According to one embodiment, a method for identifying blockchain address owners using test funds may include: identifying, by an identity identification computer program executed by an electronic device, a room identifier for an application deployed to a test blockchain network for a main blockchain network; fetching, by the identity identification computer program, chat messages for the room identifier; extracting, by the identity identification computer program, identifying information from the chat messages; and outputting, by the identity identification computer program, the identifying information.

In one embodiment, the identity identification computer program retrieves the room identifier using a curl.

In one embodiment, the identity identification computer program fetches the chat messages using a GET loop.

In one embodiment, the identifying information comprises a blockchain address, a username, and a display name for a user.

In one embodiment, the identifying information further comprises a plurality of cryptocurrency balances.

In one embodiment, the method may also include retrieving a name for the user from a social network.

In one embodiment, the method may also include retrieving, by the identity identification computer program, funding information for the application on the test blockchain network and the main blockchain network.

According to another embodiment, a non-transitory computer readable storage medium, may include instructions stored thereon, which when read and executed by one or more computer processors, cause the one or more computer processors to perform steps including: identifying a room identifier for an application deployed to a test blockchain network for a main blockchain network; fetching chat messages for the room identifier; extracting identifying information from the chat messages; and outputting the identifying information.

In one embodiment, the room identifier is retrieved using a curl.

In one embodiment, the chat messages are fetched using a GET loop.

In one embodiment, the identifying information comprises a blockchain address, a username, and a display name for a user.

In one embodiment, the identifying information further comprises a plurality of cryptocurrency balances.

In one embodiment, the non-transitory computer readable storage medium may also include instructions stored thereon, which when read and executed by one or more computer processors, cause the one or more computer processors to retrieve a name for the user from a social network.

In one embodiment, the non-transitory computer readable storage medium may also include instructions stored thereon, which when read and executed by one or more computer processors, cause the one or more computer processors to retrieve funding information for the application on the test blockchain network and the main blockchain network.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods identifying blockchain address owners using test funds.

A testnet is an instance of a blockchain that is used for testing and experimentation without risk to real funds or to the primary instance of the blockchain. Testnet funds, such as coins, are separate and distinct from coins used on the primary instance of the blockchain and do not have any value. Faucets provide the testnet coins for free, and allow experimentation with the testnet.

Embodiments may create a mapping of blockchain addresses, such as those on Ethereum, okexchain, and evannetwork, using test funds, such as testnet faucet funds. For example, to obtain testnet funds, a developer may use a testnet/faucet room on an open-source development platform with a cloud repository hosting service account login, and then post the developer's blockchain address to where the developer wants to receive the testnet funds. Embodiments use information received to map a user's real identity to the user's blockchain address.

For example, a developer may register a testnet application on gitter, and may identify a "kovan-testnet/faucet" roomId using a curl from the developer's terminal. An example is curl-X POST-i-H "Content-Type: application/json"-H "Accept: application/json"-H "Authorization: Bearer YOUR_TOKEN" "https://api.gitter.im/v1/rooms"-d '{"uri": "kovan-testnet/faucet"}'.

Embodiments may then extract the room id from the response, and fetch all the chat messages using a loop and an endpoint. An example endpoint is GET/v1/rooms/:roomId/chatMessages?limit=50. Note that in this example, only the last 50 messages are retrieved; other parameters may be used as is necessary and/or desired. Pagination may be used to get all the other previous messages.

The records may include, for example, addresses, usernames, display names, avatar URLs, sources, fund balances, etc. Using this information, and personal information shared such as name, email address, LinkedIn account, etc., the GitHub/Twitter account may expose the identity of the address/wallet owner. If the same address was used in mainnet, this could expose the address owner's crypto financial activity, along with other owned addresses by using some advanced methods.

Figure 1:
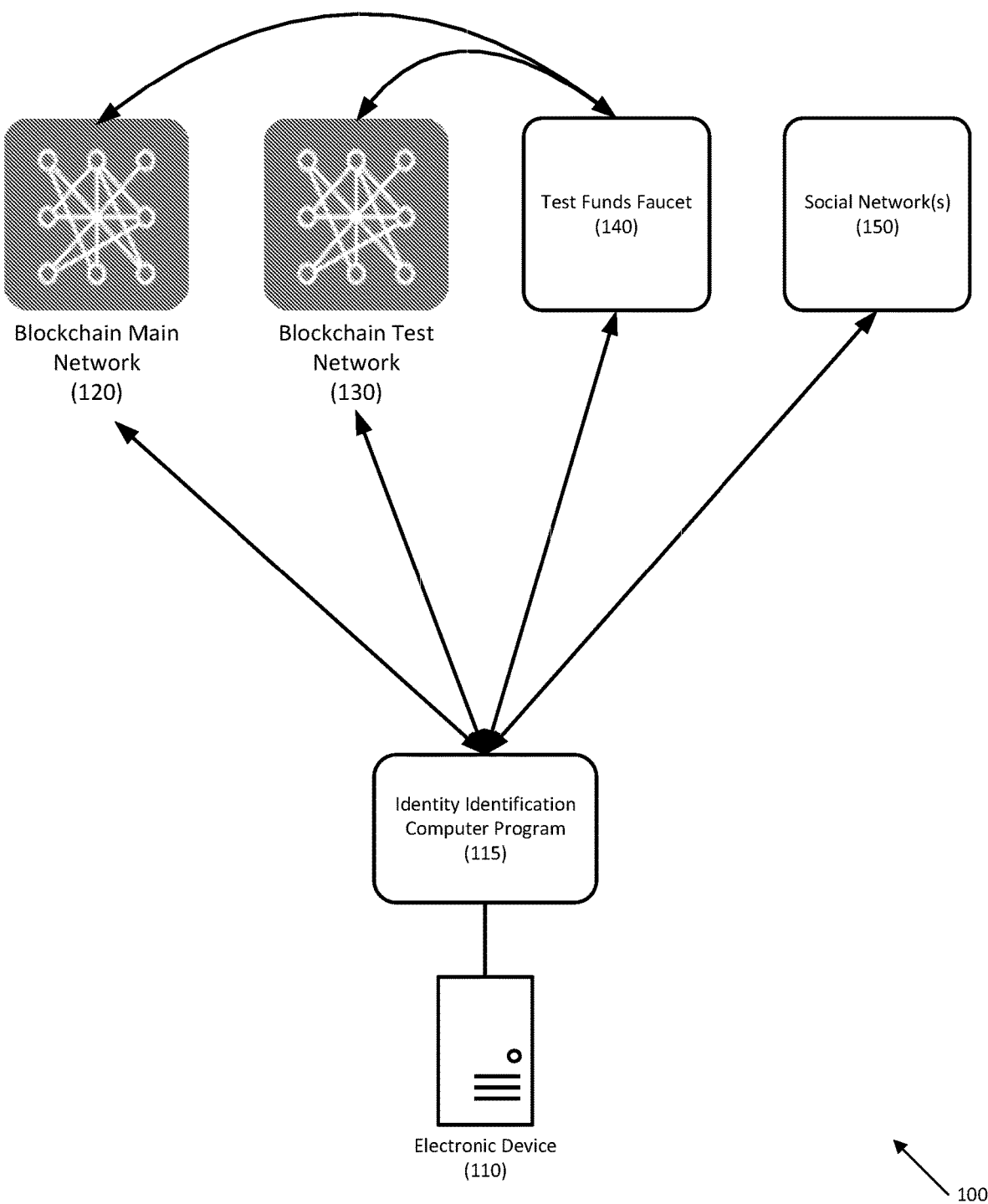
FIG. 1 depicts a system for identifying blockchain address owners using test funds according an embodiment.

Referring to FIG. 1, a system for identifying blockchain address owners using test funds is disclosed according to an embodiment. System 100 may include electronic device 110 that may execute identity identification computer program 115. In one embodiment, electronic device 110 may be any suitable electronic device, including servers (e.g., cloud and/or physical), computers (e.g., workstations, desktops, laptops, notebooks, tablets, etc.), smart devices, Internet of Things (IoT) appliances, etc.

Identity identification computer program 115 may be a computer program that may identify the owners of blockchain addresses. Identity identification computer program 115 may interface with blockchain main network (or mainnet) 120, blockchain test network (or testnet) 130, test funds faucet (140), and one or more social networks 150.

Blockchain main network 120 may be any suitable blockchain network, including Ethereum, okexchain, and evan-network.

Blockchain test network 130 may be an instance of blockchain main network 120 that is use for testing and experimentation without risk to real funds or to blockchain main network 120.

Testnet funds faucet 140 may provide test funds for blockchain test network 130 and blockchain main network 120.

Social networks 150 may provide information on users of blockchain main network 120 and/or blockchain test network 130. For example, social networks may provide identifying information on users using, for example, a user's email address.

Figure 2:
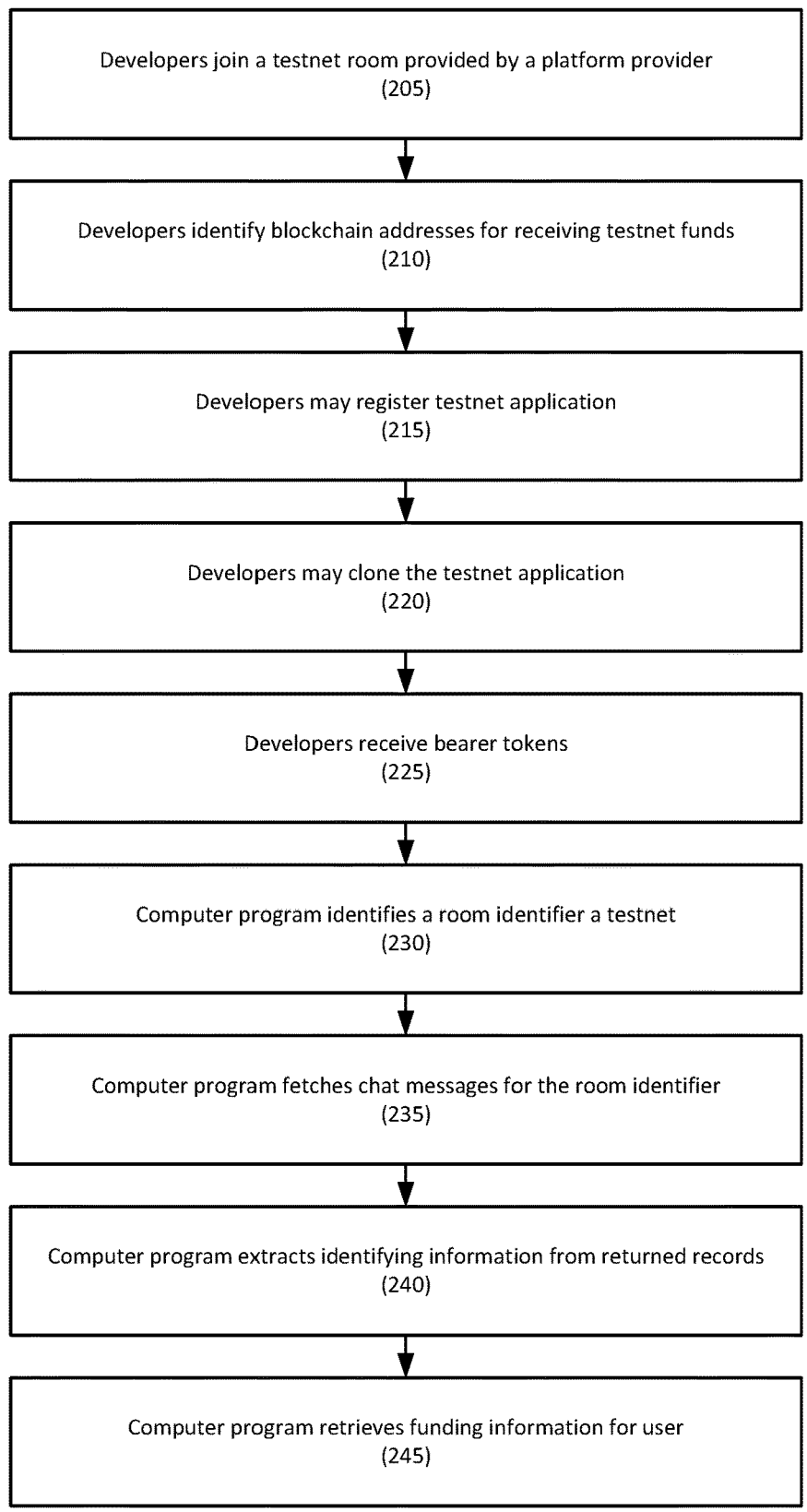
FIG. 2 depicts a method for identifying blockchain address owners using test funds according an embodiment.

Referring to FIG. 2, a method for identifying blockchain address owners using test funds is disclosed according to an embodiment.

In step 205, users, such as developers, may join blockchain test network (testnet) rooms provided by a platform provider using an account. For example, a developer may join a Kovan testnet/faucet room on gitter using a GitHub account login.

In step 210, the developers may identify blockchain addresses for receiving funds. For example, the developer may post an address on a blockchain main network (e.g., an Ethereum address) at which the developer would like to receive the testnet funds. Funds will be sent to the blockchain address.

In step 215, the developer may register a testnet application. For example, the developer may sign in to gitter development and register the testnet application.

In step 220, the developers may optionally clone the testnet application.

In step 225, the developer may open a browser to receive and save a bearer token.

In step 230, an identity identification computer program may identify a room identifier for the testnet using, for example, a curl. An example of a curl is: curl-X POST-i-H "Content-Type: application/json"-H "Accept: application/json"-H "Authorization: Bearer YOUR_TOKEN" "https://api.gitter.im/v1/rooms"-d '{"uri": "kovantestnet/faucet"}'. The curl returns a room id.

In step 235, the identity identification computer program may fetch chat messages using a loop. An example of a loop GET/v1/rooms/:roomId/chatMessages?limit=50. Note that this only retrieves the last 50 messages; other parameters may be used. Pagination may be used to get all the other previous messages.

The chat messages may include information such as a faucet request time sent, address, username, displayname, avataUrl, source, cryptocurrency balance, USDT cryptocurrecy balance, USDC cryptocurrency balance, Dai cryptocurrency balance, and WBTC Balance.

An example of a record is the following: 2021-09-07T01:04:39.836Z, 0x6773ec31aa7719b30a02a3ab151a2b578ef17842, XXXos, AA AAAABBBBB, https://avatars2.githubusercontent.com/CCCCCCCCCCC, github, 0.008869738068446203, 0, 0, 0, 0.

In step 240, the identity identification computer program may extract identifying information from the returned records. For example, using the returned information, the computer program may extract the date the faucet request was submitted (2021-09-07T01:04:39.836Z), a GitHub user name https://avatars2.githubusercontent.com/CCCCCCCCCCC, github), a real full name, and a user avatar. By accessing the user's GitHub information, other information, such as the user's email address, other social networking profiles, etc. may be retrieved.

In step 245, the identity identification computer program may use the user's blockchain address (e.g., 0x6773ec31aa7719b30a02a3ab151a2b578ef17842) to retrieve funding information for the user on the testnet and on the mainnet.

Figure 3:
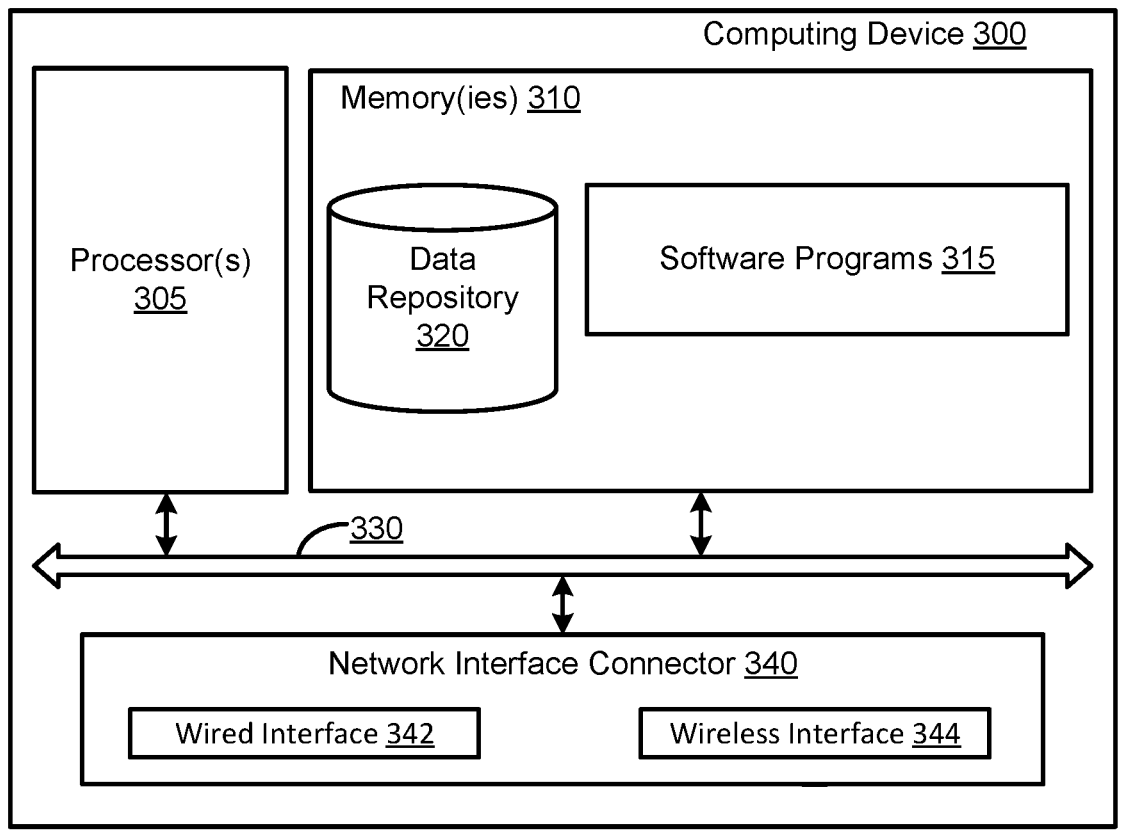
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for identifying blockchain address owners using test funds, comprising:
    joining, by an identity identification computer program executed by an electronic device, a blockchain testnet room on a test blockchain network;
    posting, by the identity identification computer program, a first blockchain address on a main blockchain network, wherein the first blockchain address is configured to receive testnet funds;
    registering, by the identity identification computer program, a testnet application;
    identifying, by the identity identification computer program, a room identifier for an application deployed to the blockchain room;
    iteratively fetching, by the identity identification computer program and using a loop, chat messages for the room identifier, wherein at least one of the chat messages comprises identifying information;
    extracting, by the identity identification computer program, the identifying information;
    retrieving, by the identity identification computer program, an identification of an owner of the second blockchain address from a social network using the identifying information; and
    outputting, by the identity identification computer program, the identification.

2. The method of claim 1, wherein the identity identification computer program retrieves the room identifier using a curl.

3. The method of claim 1, wherein the identity identification computer program iteratively fetches the chat messages using a GET loop.

4. The method of claim 1, wherein the identifying information comprises a blockchain address, a username, and a display name for a user.

5. The method of claim 4, wherein the identifying information further comprises a plurality of cryptocurrency balances.

6. The method of claim 1, further comprising:
    retrieving, by the identity identification computer program, funding information for the application on the test blockchain network and the main blockchain network.

7. A non-transitory computer readable storage medium, including instructions stored thereon, which when read and executed by one or more computer processors, cause the one or more computer processors to perform steps comprising:
    joining a blockchain testnet room on a test blockchain network;
    posting a first blockchain address on a main blockchain network, wherein the first blockchain address is configured to receive testnet funds;
    registering testnet application;
    identifying a room identifier for an application deployed to the blockchain room;
    iteratively fetching chat messages for the room identifier using a loop, wherein at least one of the chat messages comprises identifying information;
    extracting the identifying information from the chat messages;

retrieving an identification of an owner of the second blockchain address from a social network using the identifying information; and outputting the identification.

8. The non-transitory computer readable storage medium of claim 7, wherein the room identifier is retrieved using a curl.

9. The non-transitory computer readable storage medium of claim 7, wherein the chat messages are iteratively fetched using a GET loop.

10. The non-transitory computer readable storage medium of claim 7, wherein the identifying information comprises a blockchain address, a username, and a display name for a user.

11. The non-transitory computer readable storage medium of claim 10, wherein the identifying information further comprises a plurality of cryptocurrency balances.

12. The non-transitory computer readable storage medium of claim 7, further comprising instructions stored thereon, which when read and executed by one or more computer processors, cause the one or more computer processors to retrieve funding information for the application on the test blockchain network and the main blockchain network.

\* \* \* \* \*